United States Patent
Chu

[11] 3,884,546
[45] May 20, 1975

[54] SPECTRUM SHAPING WITH PARITY SEQUENCES

[75] Inventor: David C. Chu, Menlo Park, Calif.

[73] Assignee: Hewlett-Packard Company, Palo Alto, Calif.

[22] Filed: July 30, 1973

[21] Appl. No.: 383,639

[52] U.S. Cl. .............................. 350/3.5; 350/162 SF
[51] Int. Cl. ............................................. G02b 27/00
[58] Field of Search ..................................... 350/3.5

[56] References Cited
UNITED STATES PATENTS

3,606,515  9/1971  Hirsch et al. ........................ 350/3.5
3,623,786  11/1971  Dammann ............................ 350/3.5

OTHER PUBLICATIONS

Chu et al., "Spectrum Shaping with Parity Sequences," Applied Optics, Vol. 11, No. 8, Aug. 1972, pp. 1,716–1,724.
Chu et al., "Multiemulsion ON–Axis Computer Generated Hologram," Applied Optics, Vol. 12, No. 7, July 1973, pp. 1,386–1,388.
Haskell et al., "New Coding Technique for Computer Generated Holograms," Applied Optics, Vol. 11, No. 11, Nov. 1972, pp. 2,712–2,714.

Primary Examiner—John K. Corbin
Attorney, Agent, or Firm—Ronald E. Grubman

[57] ABSTRACT

A method is disclosed for shaping a Fourier transform spectrum of an array of input data. The method may be used to produce a Fourier spectrum in which the moduli of the Fourier coefficients are all equal to one predetermined constant. This makes possible hologram synthesis with phase only transmittance and is an improvement over kinoforms where amplitude information must be discarded. The present method rests on the introduction of an auxiliary parity array of data which is interlaced with the true data array to be stored, the parity array being chosen so that a Fourier spectrum of the combined data and parity arrays has a level spectrum. In an image reconstructed from the hologram, optical detectors may be positioned to detect only the reconstructed data points. Other spectrum shaping is also possible including phase quantization.

16 Claims, 12 Drawing Figures

SPECTRUM SHAPING WITH PARITY SEQUENCES

BACKGROUND OF THE INVENTION

This invention is concerned with the problem of producing a Fourier transform of a set of discrete data points in such a way that the resulting Fourier transform spectrum is level. The invention has particular utility in connection with the generation of holographic memories with a digital computer. Such a hologram may be used to store information associated with a data matrix usually of ones and zeros but not limited to such representing digital data such as one or more alphanumeric characters or other bit patterns. Subsequent illumination of the computer generated hologram with coherent light will produce a matrix of light and dark spots reproducing the data pattern. For many applications, holographic storage is preferable to optical storage of the raw data, since localized defects on the storage medium will be distributed throughout the final image, rather than degrading totally portions of the data as would occur with direct storage. This is especially true in applications where the data to be stored is of a very small size, so that dust particles or scratches would obliterate large sections of the data. Additionally, if the data is stored on a hologram, it is possible to add redundancy by repeating the hologram in an array. Since Fourier transform holograms are translationally invarient, illumination of the array will produce a single well defined image. On the other hand, if raw data itself were to be stored redundantly, it would require elaborate detection schemes to produce a single final image. Since the hologram is translationally invarient, it is an additional advantage that positioning of the hologram is not critical for the reconstruction. On the other hand, if raw data were to be stored and optically displayed using detectors, the detectors would have to be positioned with an accuracy about equal to the spacing of the data bits in the matrix.

Computer generated holograms are typically constructed by computing the Fourier (or Fresnel) transform of a dot matrix representing the data to be stored. Thus, the original image is represented in the Fourier transform by a sequence of Fourier coefficients, each with an amplitude and a phase. Holograms are constructed from the stored amplitudes and phases by generating plots of the amplitude and phase information, and then exposing photographic films to the plotted patterns. Since the amplitude and phase information are independent, it is in principle necessary to produce two independent photographic plates, one of which will affect the amplitude of an illuminating beam without differentially retarding the phase, and the other of which will retard the phase without affecting the amplitude. However, such a direct scheme is highly impractical since there are numerous difficulites in aligning the two plates to produce a well defined reconstructed image.

In the prior art, there are known several approximations to an exact hologram which avoid the above-mentioned problem. One method is disclosed in an article entitled "Computer-Generated Binary Holograms" by B. R. Brown and A. W. Lohmann, in the IBM Journal of Research and Development, March 1969. In these binary holograms the Fourier amplitudes and phases are stored on a hologram which is divided into cells. Each cell includes an opaque background with a transparent rectangular space. The area of the rectangular space is proportional to a Fourier amplitude, while the position in the cell is related to the associated Fourier phase. Upon subsequent illumination by a coherent light source, the first order diffraction from the hologram reproduces an image from the recorded amplitudes and phases. Although the binary hologram has the advantage of ease of manufacture, reconstruction of the image is extremely inefficient since most of the illuminating energy goes into an unwanted zero order image. Additionally, since the amplitude and phase information are quantized into discrete points depending on the finite plotter resolution, the reconstructed image will not be an accurate reproduction of the original data. An additional disadvantage of this method is that each Fourier coefficient occupies a finite number of resolution points which make up a cell, a problem which is exacerbated if an attempt is made to provide better resolution by increasing the number of resolution points comprising a cell.

Another technique is disclosed in an article entitled "The Kinoform: a new Waveform Reconstruction Device" by L. B. Lesem, P. M. Hirsch, and J. A. Jordan, Jr., in the IBM Journal of Research and Development, 13, page 150 (1969). The basis of a kinoform is to quantize the Fourier amplitudes to a single constant level. Thus, in a kinoform, only the information carried by the Fourier phases is stored. Typically, a plotter records the computer generated phase information, which is then photographed. The photographic emulsion is developed and bleached to produce surface relief phenomena and a non-uniform refractive index. The combination of relief and non-uniform refractive index serves to retard the phase of a coherent illuminating source, without significant amplitude attenuation. Kinoforms are not entirely satisfactory, however, since the quantization of the Fourier amplitudes to a single level leads to a loss of fidelity of the reconstructed data. Another problem is that the intensity of the bright spots in the reconstructed image is not uniform, but depends on the relative number of bright spots making up the image; i.e., a large number of bright spots will appear dim, while a small number of bright spots will appear excessively bright, an undesirable property in digital data application.

In the prior art, a technique commonly referred to as phase coding has been used to improve the fidelity of images reconstructed from a kinoform. The technique replaces each 1 in the data to be stored by an exponential function of unit magnitude and a particular phase. The phases are chosen to result in a Fourier spectrum whose amplitudes are approximately constant, i.e., the dynamic range of the amplitude spectrum is reduced. This method leads to improved fidelity of the hologram, but does not achieve optimum results, since the resulting Fourier spectrum is not flat, but still extends over a definite range. Additionally, the phase coding method has no effect on the problem of non-uniform intensity as a function of the Hamming weight of the data (i.e., the number of ones).

Kinoforms are advantageous, however, in that the reconstruction is accomplished on axis; i.e., an incident plane wave produces a single central image, so that all of the illuminating energy is directed into a useful final image. Additionally, each resolution spot on the kinoform represents one Fourier coefficient resulting in very economic use of film resolution. (For distinct dots in the reconstructed data, however, the kinoform patterns must be replicated as is with any other hologram.)

It would thus be desirable to have a hologram with the efficiency and resolution of a kinoform, but with improved fidelity and uniform intensity per bit of the reconstructed data points.

SUMMARY OF THE INVENTION

In accordance with the preferred embodiments, the present method provides for the leveling of a Fourier transform spectrum and may be utilized in any application where a level spectrum is desired. The method is especially useful in connection with holograms, and in particular in connection with phase-type holograms. The method interlaces an array of data points to be stored with another array, called a parity array, in such a way that the Fourier transform of the combined data and parity arrays has a level spectrum; i.e., the moduli of the Fourier coefficients of the combined array are all equal to one predetermined constant. This is accomplished by demanding that the modulus and phase of each Fourier coefficient of the parity array be added vectorially to the corresponding Fourier coefficient of the data array, so that the resultant complex number lies on a predetermined circle in the complex plane. A phase type hologram may then be used to store the phases of the Fourier coefficients. In an image reconstructed from the hologram, the data points and parity points will be interlaced, so that if optical detectors are placed only at the expected positions of the data points, the parity points will not appear. In various of the embodiments of the method, the combined Fourier transform coefficients are rearranged in the hologram matrix to displace the parity bits in the reconstructed image into a region away from the data bits. In yet another embodiment, the method is used to quantize the phases of the Fourier spectrum to a few discrete levels.

DESCRIPTION OF THE INVENTION

Figure 1:
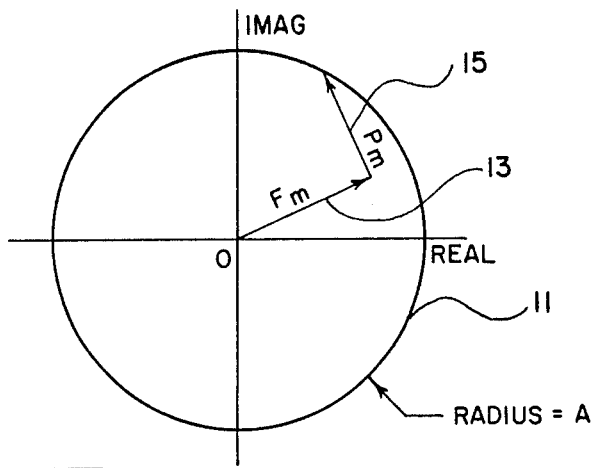
FIG. 1 is a geometric representation of an original Fourier transform component and a parity component chosen for spectrum shaping.

We consider the problem of data processing by means of Fourier transformation, where it is necessary to quantize the magnitudes or phases in the Fourier domain into a discrete set of values. We discuss a method for digitally generating a spectrum which provides a suitably shaped Fourier spectrum, whose inverse transform contains the original data in known locations unpertrubed.

We assume that a data sequence consists of an array of data points, which may be, e.g., an array of ones and zeros. The method to be discussed rests on the introduction of an auxiliary "parity" sequence of data (generally not binary), which is interlaced with the true data sequence. We will discuss the use of a parity sequence to shape the Fourier spectrum which includes, e.g., quantizing the Fourier amplitudes to a single level if desired, or to a discrete set of levels, or alternately to quantize the Fourier phases. First, however, we present general background techniques relevant to both cases, using as an example a one dimensional array to be stored.

Consider a data sequence to be stored of N complex numbers $\{f_n\}$, where $n = 0,1,..., N - 1$. We represent the discrete Fourier transform (DFT) of $\{f_n\}$ by a sequence $\{F_m\}$, where $m = 0,1,...,N - 1$. The relation between $\{f_n\}$ and $\{F_m\}$ is as follows:

$$F_m = \sum_{n=0}^{N-1} f_n \exp\left(-i\frac{2\pi mn}{N}\right). \quad (1a)$$

$$f_n = \frac{1}{N}\sum_{m=0}^{N-1} F_m \exp\left(i\frac{2\pi mn}{N}\right). \quad (1b)$$

We say that $\{f_n\}$ is the inverse DFT of $\{F_m\}$

Let $\{F_m'\}$, be a sequence of 2N complex numbers that is simply the sequence $\{F_m\}$ repeated once, i.e., $$F_m' = \begin{cases} F_m & m=0,1,...,N-1, \\ F_{m-N} & m=N,N+1,...,2N-1. \end{cases} \quad (2)$$

[In fact, the sequence $\{F_m\}$ computed in accord with Eq. (1b) is periodic with period N, and the sequence $\{F_m'\}$ simply consists of two of these periods.] It is shown in Appendix A that the sequence $\{f_m'\}$ with DFT $\{F_m'\}$ is related to the original sequence $\{f_m\}$ by $$f_n' = \begin{cases} f_{n/2} & (n \text{ even}) \\ 0 & (n \text{ odd}) \end{cases} \quad n=0,1...,2N-1. \quad (3)$$

Thus the sequence $\{f_n'\}$ consists of the sequence $\{f_n\}$ interlaced with zeros.

Continuing, let $\{P_m\}$ be a sequence of N complex numbers and define a sequence $\{P_m'\}$ to be a sequence of 2N complex numbers such that $$P_m' = \begin{cases} P_m & m=0,1,2,...N-1. \\ -P_{m-N} & m=N,N+1,...,2N-1. \end{cases} \quad (4)$$

It is shown in Appendix A that $\{p_n'\}$, the inverse DFT of $\{P_m'\}$ is given by $$p_n' = \begin{cases} 0 & n \text{ even} \\ p_{(n-1)/2} & n \text{ odd} \end{cases} \quad n=0,1,\ldots,2N-1. \quad (5)$$

Here $\{p_n\}$ is the N-point inverse DFT of the sequence $\{P_m \exp[i(\pi m/N)]\}$, where $m = 0,1,\ldots,N - 1$. We refer to the sequence $\{P_n\}$ as the parity sequence and note that $\{p_n'\}$ is simply the parity sequence interlaced with zeros. Furthermore, the sequences $\{f_n'\}$ and $\{p_n'\}$ are seen to be noninterfering, i.e., one is zero where the other is non-zero and vice versa.

Finally, we let $\{G_m\}$ be a 2N-point sequence such that $$G_m = F_m' + P_m' \quad m = 0,1,\ldots,2N - 1. \quad (6a)$$

This sequence has an inverse DFT $\{g_n\}$ given by $$g_n = f_n' + p_n' \quad n = 0,1,\ldots,2N - 1. \quad (6b)$$

Note that, by virtue of the noninterfering nature of $f_n' + p_n'$, we have $$g_n = \begin{cases} f_{n/2} & n \text{ even} \\ p_{(n-1)/2} & n \text{ odd} \end{cases} \quad n=0,1,\ldots,2N-1. \quad (7)$$

Thus, the spectral sequence $\{P_m'\}$ in no way influences the values of $\{g_n\}$ for $n$ even. However, the values of $g_n$ for $n$ odd are directly determined by the spectrum $\{p_m'\}$. Therefore, the procedure may be used to arbitrarily shape a spectrum without perturbing the original data array. In every case, the individual spectral components $G_j$ satisfy the relation $$\frac{1}{2}(G_m + G_{m+N}) = F_m \quad (8)$$

within an overall scale factor.

It is therefore possible to recover the original data sequence $f_n$ from a hologram which stores the entire sequence $\{G_m\}$, thereby producing a reconstructed image of the sequence $g_n$ (i.e. the interlaced sequences $f_n$ and $p_n$).

Our goal is to find a parity sequence $\{p_n\}$, or equivalently a spectral sequence $P_n$, such that all spectral components $G_m$ have the same modulus, i.e., $$|G_m| = A \quad m = 0,1,\ldots,N - 1, \quad (9)$$

where $A$ is a prechosen constant. We shall assume that the phase distribution across the spectrum may take on any desired values.

A solution to this problem can always be found provided we require $A$ to be greater than or equal to the largest value of $|F_m|$ in the data spectrum, i.e., $$A \geq \max_m |F_m| \quad (m=0,1,\ldots,N-1). \quad (10)$$

If a certain amount of distortion of the original data can be tolerated in the recovery, greater efficiency can be obtained by choosing an $A$ which is larger than a substantial number of the $|F_m|$. When $A$ satisfies Eq. (10), the solution can be directly seen by referring to FIG. 1, which shows a circle 11 of radius $A$ in the complex plane defined by two axes labeled Real and Imaginary. A vector 13 is shown which represents a typical one of the complex Fourier coefficients $F_m$ of the data sequence. Another vector 15 represents the associated Fourier coefficient $P_m$ of the parity sequence. We choose $P_m$ orthogonal to $F_m$ and of just sufficient length so that the sum lies on a circle of radius $A$.

Figure 2:
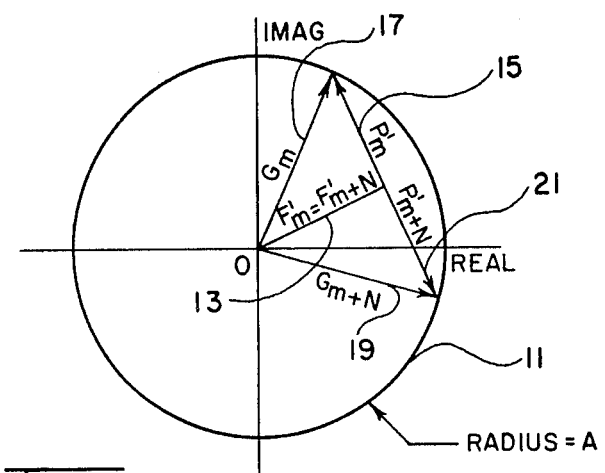
FIG. 2 shows several of the components of a shaped spectrum.

FIG. 2 shows a vector 17 representing a complex Fourier coefficient $G_m$, the sum of $F_m$ and $P_m$. A corresponding coefficient $G_{m+N}$ in the second half of the sequence $\{G_m\}$ is represented by a vector 19, which is the sum of the vectors 13 and 21 representing the corresponding coefficients $F'_{m+N}$ and $P'_{m+N}$ respectively.

Recalling from Eq. (4) that $P_m'$ changes sign for $m > N - 1$, we find that $G_m$ and $G_{m+N}$ have the same length $A$ but different angles, as illustrated. The general solution for the spectral components $P_m$ that level the spectrum is $$P_m = \pm i(Fm/|Fm|)(A^2 - |Fm|^2)^{1/2}, \quad (11)$$

where $F_m \neq 0$. If $F_m = 0$, $P_m$ is chosen to have length $A$ with any arbitrary angle $\gamma_m$.

It should be noted that the sign ambiguity in the expression for $P_m$ reflects the fact that we are free to choose $P_m$ to lead or lag $F_m$ by 90°. However, once a sign has been chosen for $P_m$, we must return to Eq. (4) to construct $P_m'$. Because of the two solutions possible for each $P_m$, there are $2^N$ different ways to choose a parity sequence that will level the spectrum to amplitude $A$.

Later, we will discuss a particular way to select the parity sequence which tends to move the parity bits away from the data bits in a display reconstructed from a hologram constructed in accordance with the present method.

From the simple geometry illustrated in FIG. 2, we may express the values of the $G_m$ directly as follows:

$$G_m = \begin{cases} A \exp\left\{i\left[\arg(F_m) \pm \cos^{-1}\frac{|F_m|}{A}\right]\right\} \\ \qquad m = 0,1,\ldots,N-1, \\ A \exp\left\{i\left[\arg(F_{m-N}) \mp \cos^{-1}\frac{|F_{m-N}|}{A}\right]\right\} \\ \qquad m = N, N+1,\ldots,2N-1. \end{cases} \quad (12)$$

In rectangular coordinates, if we define $$F_m = R_m + iX_m,$$
$$\beta_m = \left(\frac{A^2 - R_m^2 - X_m^2}{R_m^2 + X_m^2}\right)^{1/2} \quad m = 0,1,\ldots,N-1, \quad (13)$$

then $$G_m = \begin{cases} [(R_m \mp X_m\beta_m) + i(X_m \pm R_m\beta_m)] \\ \qquad m = 0,1,\ldots,N-1, \\ [(R_{m-N} \pm X_{m-N}\beta_{m-N}) + i(X_{m-N} \mp R_{m-N}\beta_{m-N})] \\ \qquad m = N, N+1,\ldots,2N-1. \end{cases} \quad (14)$$

The choice of the upper set of signs in Eqs. (12) or (14) is equivalent to choosing $P_m$ to lead $F_m$, and the lower set of signs the reverse.

If $F_m$ happens to be zero, the phase $\phi_m$ of $P_m$ is arbitrary, but once chosen we have $$G_m = \begin{cases} A(\cos\gamma_m + i\sin\gamma_m) & m=0,1,...,N-1, \\ -A(\cos\gamma_m + i\sin\gamma_m) & m=N,N+1,...,2N-1. \end{cases} \quad (15)$$

The above discussion demonstrates the mathematical solution to the problem of spectrum leveling with a parity sequence.

Figure 3:
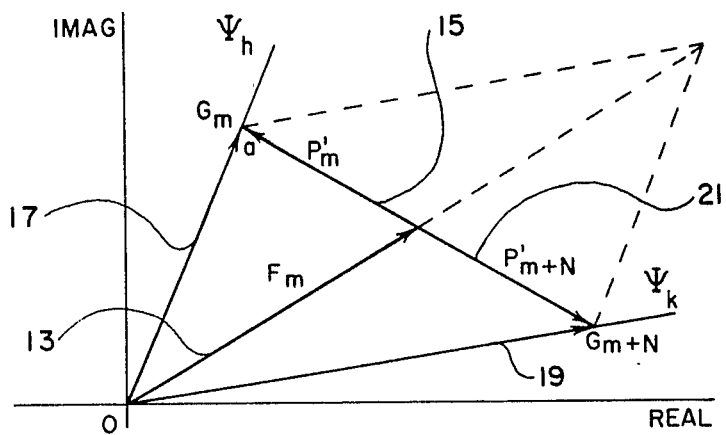
FIG. 3 illustrates use of the method for phase quantization.

Before we discuss implementation of the spectrum leveling technique, we describe another use of parity sequences for spectrum manipulation; in particular we consider a choice of a parity sequence that quantizes the phases of the spectral components onto a discrete set of allowable values. FIG. 3 shows a complex plane defined by a Real axis and an Imaginary axis. Two radial lines are shown at angles $\psi_k$ and $\psi_h$ to be defined below. Suppose the phase of all spectral components $G_m$ are to be quantized to allowable values, $\psi_k$, $k = 0,1,...K - 1$. We require that the $\psi_k$ obey the following restrictions:

$$\psi_k < \psi_{k+1}, \; 0 \leq \psi_k < 2\pi, \\ 0 < \psi_{k-1} - \psi_k < \pi, \text{ and } \psi_K \triangleq \psi_0 + 2\pi. \quad (16)$$

Under these restrictions, the phase of $F_m$ will be between two quantized phase levels $\psi_k$ and $\psi_h$, where $k<h$, and the two angles are less than $\pi$ rad apart, as illustrated in FIG. 3. A parallelogram is constructed using the two $\psi$-lines for the two adjacent sides and $F_m$ as a half diagonal. Then $P_m$ is chosen to be half of the other diagonal; again there are two possible choices corresponding to the two possible halves. The intersections of this second diagonal with the $\psi$-lines determine the values of $G_m$ and $G_{m+N}$.

Mathematically, if $F_m = |F_m| \exp(i\theta_m)$ and there exist two quantized phases $\psi_k$ and $\psi_h$ such that $\psi_k \leq \theta_m \leq \psi_h$ and $\psi_h - \psi_k < \pi$, then straightforward geometry yields the spectral components $\{G_m\}$ as follows:

$$G_m = \begin{cases} 2|F_m|\dfrac{\sin(\theta_m - \psi_k)}{\sin(\psi_h - \psi_k)}\exp(i\psi_h) & m = 0,1,...,N-1, \\ 2|F_{m-N}|\dfrac{\sin(\psi_h - \theta_{m-N})}{\sin(\psi_h - \psi_k)}\exp(i\psi_k) & m = N, N+1,...,2N-1. \end{cases} \quad (17)$$

The magnitudes and phases of the parity spectrum $\{P_m\}$ are found to be given by $$|P_m| = |F_m|\sin(\psi_k - \theta_m)/\sin\alpha, \\ \arg\{P_m\} = \psi_k + \alpha - (\pi/2) \pm (\pi/2), \quad (18)$$

where $m$ runs from 0 to $N-1$, the $\pm$ signs apply for the two possible choices of direction of $P_m$, and the angle $\alpha$ is given by $$0 < \alpha = \cot^{-1}\left[\frac{\sin(\theta_m - \psi_k)}{\sin(\psi_h - \psi_k)\sin(\psi_h - \theta_m)} - \cot(\psi_h - \psi_k)\right] \leq \pi - (\psi_h - \psi_k) \quad (19)$$

As usual, the simple relation $G_m = F_m' + P_m'$ holds.

The special case of quantization along the Real and Imaginary axes is particularly interesting. For this case, $K = 4$ and $\psi_k = K(\pi/2)$. The parallelogram of FIG. 3 becomes a rectangle, with $G_m$ and $G_{m+N}$ becoming twice the Imaginary and Real parts of $F_m$ respectively. Thus $$F_m = R_m + iN_m, \\ G_m = 2iX_m, \\ G_{m+N} = 2R_m. \quad (20)$$

The above discussion has demonstrated that, by proper choice of a parity sequence, it is possible to construct a spectrum with phases that lie only on a discrete set of allowable values. More general control of the spectrum can be achieved if desired. However, of the four quantities $|G_m|$, $\arg G_m$, $|G_{m+N}|$, $\arg G_{m+N}$, it is possible to control at most two in a predetermined fashion.

While the above discussions have been restricted to one-dimensional data sequences $\{f_n\}$, the results can be generalized to two-dimensional sequences. This capability is of considerable interest in holography, for the data to be stored often appear in a two-dimensional format. Let the data sequence in this case be represented by $\{f_{n,q}\}$, where $n = 0,1,...,N-1$ and $q = 0,1,...,Q-1$. The two dimensional DFT of this sequence is defined by $$F_{m,r} = \sum_{n=0}^{N-1}\sum_{q=0}^{Q-1} f_{n,q}\exp\left[-i2\pi\left(\frac{nm}{N} + \frac{qr}{Q}\right)\right] \\ n = 0,1,...,N-1, \quad (21a) \\ q = 0,1,...,Q-1.$$

Let $\{F_{m,r}'\}$ be a $N \times 2Q$ sequence defined by $$F_{m,r}' = \begin{cases} F_{m,r} & \begin{array}{l} m = 0,1,...,N-1, \\ r = 0,1,...,Q-1, \end{array} \\ F_{m,r-Q} & \begin{array}{l} m = 0,1,...,N-1, \\ r = Q, Q+1,...,2Q-1. \end{array} \end{cases} \quad (21b)$$

Further, let $\{P_{m,r}'\}$ be an $N \times 2q$ sequence such that for each $m$ in $(0,1,...,N-1)$, $$P_{m,r}' = \begin{cases} P_{m,r} & r=0,1,...,Q-1, \\ -P_{m,r-Q} & r=Q,Q+1,...,2Q-1, \end{cases} \quad (22)$$

where $P_{m,r}$ is to be chosen to achieve the desired spectral manipulation.

It is shown in Appendix B that $\{f_{n,q}'\}$, the inverse DFT of $\{F_{m,r}'\}$, has the properties $$f_{n,q}' = \begin{cases} f_{n,(q/2)} & q \text{ even}, \\ 0 & q \text{ odd}, \end{cases} \quad (23)$$

where $n = 0,1,...,N-1$ and $q = 0,1,...,2Q-1$. In the same appendix it is further shown that $\{P_{n,q}'\}$ has the properties $$f_{n,q}' = \begin{cases} 0 & q \text{ even} \\ \dfrac{1}{NQ}\sum_{m=0}^{N-1}\sum_{r=0}^{Q-1} P_{m,r}\exp\left\{i2\pi\left(\dfrac{nm}{N} + \dfrac{rq}{2Q}\right)\right\} & q \text{ odd} \end{cases} \quad (24)$$

for $n = 0,1,...,N-1$ and $q = 0,1,...,2Q-1$. Hence the data and parity sequences again do not interfere.

Adding $P_{m,r}'$ and $F_{m,r}'$ and performing an inverse DFT, we obtain an $N \times 2Q$ sequence in which rows of data sequences are interlaced with rows of parity sequences. Interchanging $n$ and $q$ in the analysis leads to columns of data sequences interlaced with columns of parity sequences. Alternately, extending the hologram to $2N$ by $2Q$ by letting $G_{m, r} = G_{m+N, r+Q} = F_{m, r} + P_{m, r}$ and $G_{m, r+Q} = G_{m+N, r} = F_{m, r} - P_{m, r}$, data and parity are interlaced in checkerboard fashion. In the general case, the spectrum $G$ can be extended to order $yN \times zQ$ ($y$ and $z$ are arbitrary integers). In this case, the relationship among the spectral components $G_{mr}$ corresponding to Eq. 8 of the one dimensional method is $$F_{mp} = \frac{1}{yz} \sum_{i=0}^{y-1} \sum_{j=0}^{z-1} G_{m+iN, p+jQ}$$

$$m = 0, 1, \ldots, N - 1$$
$$p = 0, 1, \ldots, Q - 1$$

(25)

Thus, if an image is to be reconstructed from a hologram utilizing the present technique, detectors placed only at positions corresponding to the known locations of the data bits will ignore the parity sequence entirely.

For spectrum leveling we choose as before $$P_{m,r} = \pm i(F_{m,r}/|F_{m,r}|)(A^2 - |F_{m,r}|^2)^{1/2}.$$

(26)

Again the constant $A$ must be chosen such that $$A \geq \max_{m,r} |F_{m,r}|.$$

(27)

As a point of some interest, we note that for the case $Q = 1$, corresponding to a one-dimensional data sequence, the combined sequence has two rows, one the original data sequence and the second the parity sequence. In this case the two sequences are separated, rather than interlaced as in the one-dimensional case. The above results can be generalized to dimensions higher than two.

For the case of greatest interest here, the original data to be stored consist of a sequence of real-valued binary ones and zeros. The DFT of such a sequence often yields a spectrum with a large dynamic range, the $m = 0$ component typically being extremely large by comparison with other components. Such an occurrence has an undesirable effect on the parity sequence method for spectrum leveling, for the spectrum must be level to a value $$A \geq \max_{m} |F_m|.$$

As a consequence of the high required value of $A$, most of the optical intensity incident on the hologram during the reading operation is deflected into the parity sequence, with only a small fraction of the intensity appearing in the data bits that fall on the detectors. Some method for minimizing the intensity of the parity sequence (i.e., minimizing the maximum value of $F_m$) is therefore desired.

A partial solution to this problem is obtained by phase coding the data bits in order to prelevel the spectrum as far as possible before applying the parity sequence method. Thus we replace each binary 1 in the data sequence with a complex number $\exp(j\phi_n)$, where the $\phi_n$ are chosen in order to minimize the dynamic range of the spectrum. Since the detectors read only the intensity of the data bits, the sequence of binary zeros and ones recovered is not directly affected by the phase coding. To determine the phases $\phi_n$ which will pre-level the Fourier spectrum, we use a method developed by M. R. Schroeder in IEEE Trans. Inform Theory IT-16, 85 (1970). In accordance with Schroeder's method, we choose the $\phi_n$ as follows:

$$\phi_n = \begin{cases} 0 & n = 0, \\ -2\pi \sum_{j=0}^{n-1} (n-j) p_j, & \begin{array}{l} n = 1, 2, \ldots, N-1, \\ N \text{ odd} \end{array} \\ -2\pi \sum_{j=0}^{n-1} (n-j) p_j + \frac{\pi}{N} n, & \begin{array}{l} n = 1, 2, \ldots, N-1, \\ N \text{ even} \end{array} \end{cases}$$

(28)

where $$p_j = |f_j|^2 / \sum_{n=0}^{N-1} |f_n|^2.$$

(29)

For the case of a sequence of all 1's, the above coding requires $$\phi_n = -\pi[n(n+1)/N] \quad n = 0, 1, \ldots, N-1$$

(30)

for $N$ odd. This particular phase coding levels the spectrum perfectly if $N$ is odd. For $N$ even, the DFT can also be leveled exactly if we choose $$\phi_n = -(\pi/N) n^2 \quad n = 0, 1, \ldots, N-1.$$

(31)

For binary sequences that do not contain all 1's, the above phase coding methods will not perfectly level the DFT. However, computer experiments have shown that even for such sequences the above phase coding method generally accomplishes a considerable reduction of dynamic range in the DFT. Thus it is generally advisable to precede the parity sequence construction by phase coding as in Eq. (28).

For two dimensions a useful phase code is to multiply each data point $f_{n,q}$ by the function $\exp(i2\pi nq/N)$ for an $N \times N$ data block.

To illustrate the methods of spectrum leveling and spectrum phase quantization by the parity sequence method, we consider two sixteen-bit binary sequences $\{U\}$ and $\{V\}$ as follows:

$$\{U\} = \{1101111011110110\},$$
$$\{V\} = \{1000100011000010\}.$$

(32)

These sequences have Hamming weights of 12 and 5, respectively. However, in spite of their very different weights, we shall find parity sequences that level their spectra to the same moduli. The level chosen for the spectra is $(32)^{1/2}$, which is $(2)^{1/2}$ larger than $(16)^{1/2}$, the modulus of the preleveled DFT of a sequence consisting of sixteen ones.

Figure 4:
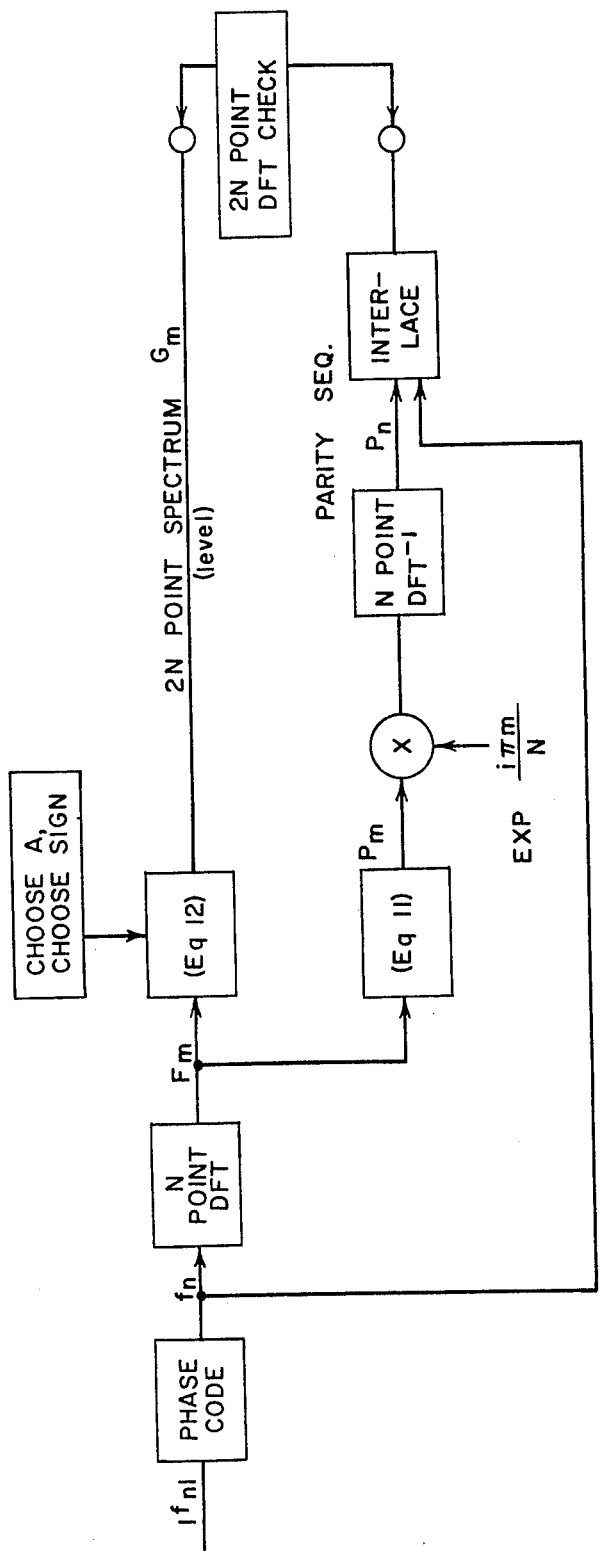
FIG. 4 is a block diagram illustrating the steps used in obtaining a level spectrum from data sequence.

A block diagram outlining the operations performed is shown in FIG. 4. Each data sequence is phase coded in accord with Eq. (28), following which N-point DFT ($N = 16$) is performed. From this DFT, the leveled 2N-point spectrum $\{G_m\}$ is formed with Eq. (12) using the upper set of signs and a value of $(32)^{1/2}$ for A.

As a means of checking the results, the spectrum $\{F_m\}$ is also used to generate $\{P_m\}$ with Eq. (11). Each $P_m$ is multiplied by $\exp[i(\pi m/N)]$, following which an $N$-point inverse DFT is performed to obtain the parity sequence. The parity sequence and data sequence are then interlaced. A $2N$-point DFT of the interlaced sequence is performed, and the result is compared with the spectrum $\{G_m\}$ calculated previously. If the results are identical, the spectrum $\{G_m\}$ is accepted as the correct result.

For spectrum phase quantization, Eq. (17) replaces Eq. (12), selection of the quantized phases $\psi_k$ replaces selection of $A$, and Eq. (18) replaces Eq. (11).

Figure 5:
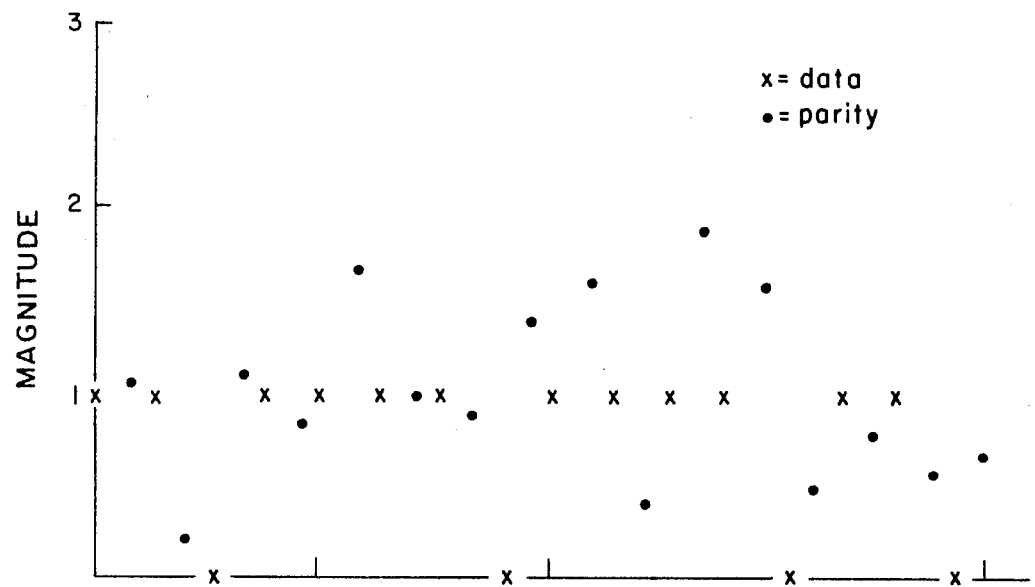
FIG. 5a shows magnitudes and phases of an interlaced data-parity sequence for leveling the spectrum of a data sequence {1101111011110110}.
FIG. 5b shows the moduli and phases of the leveled spectrum.
Figure 5:
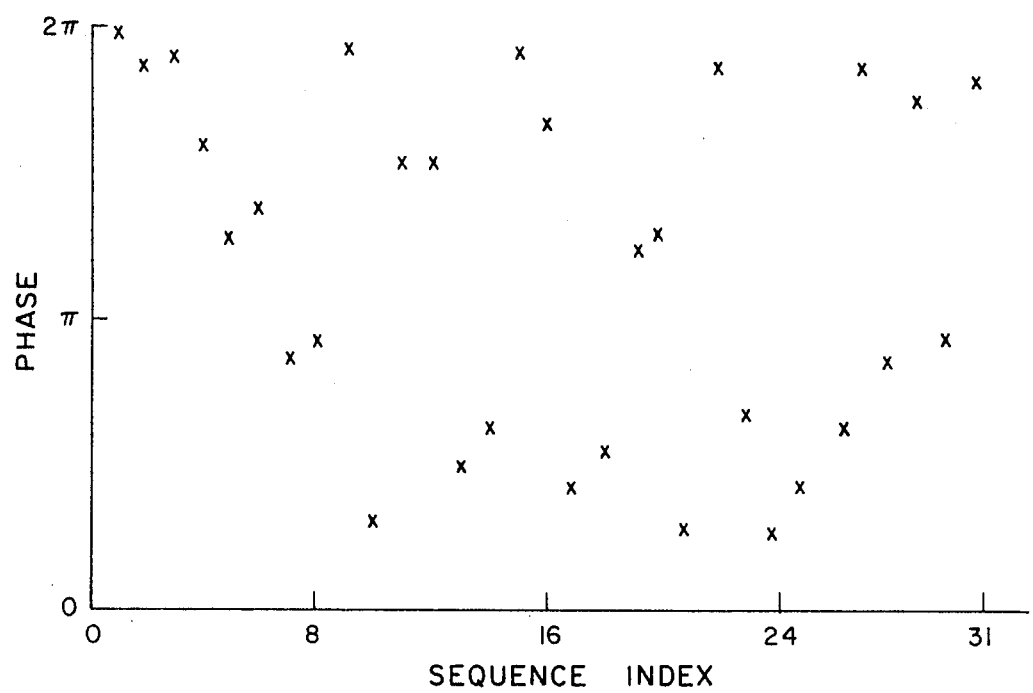
Figure 5:
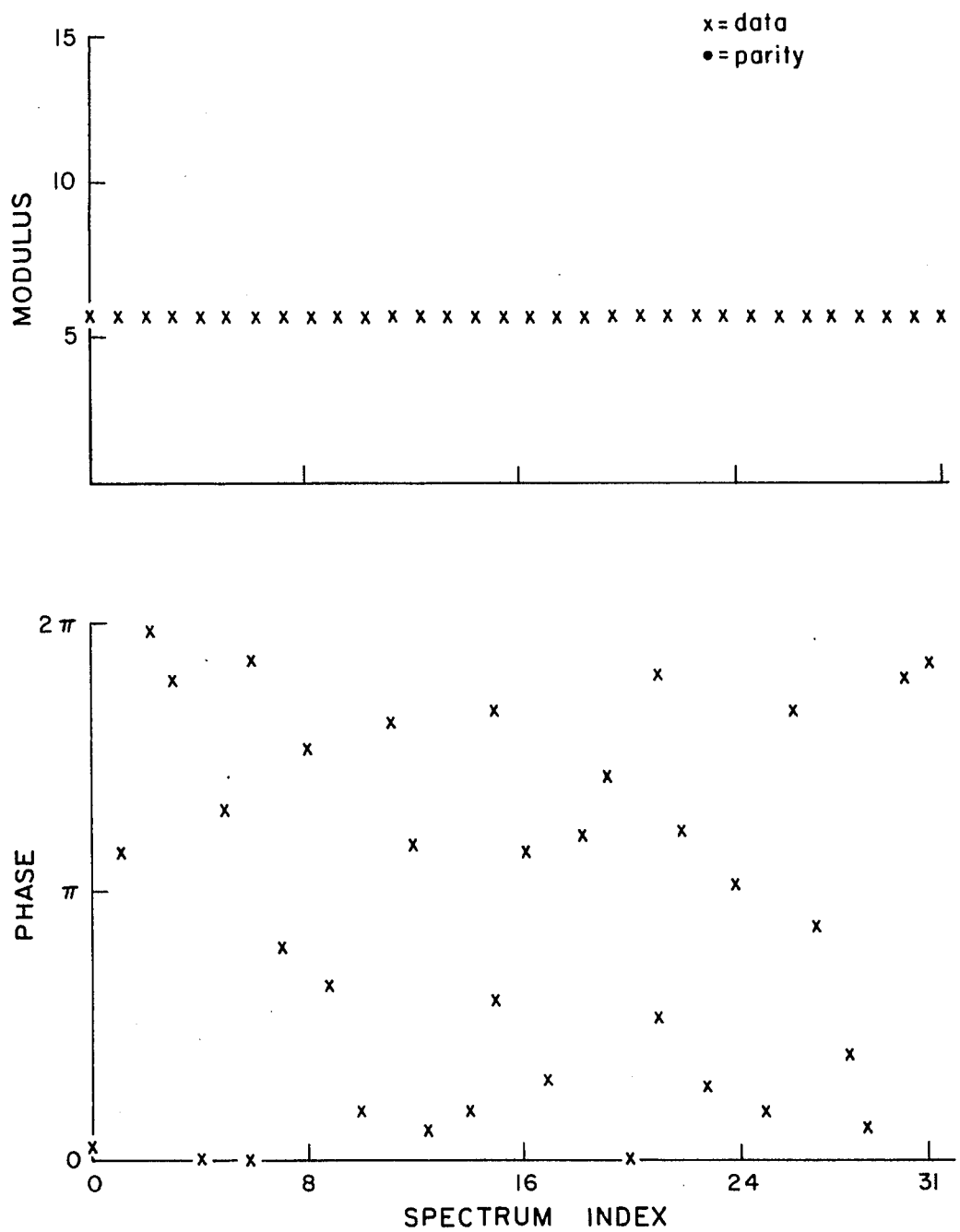
Figure 6:
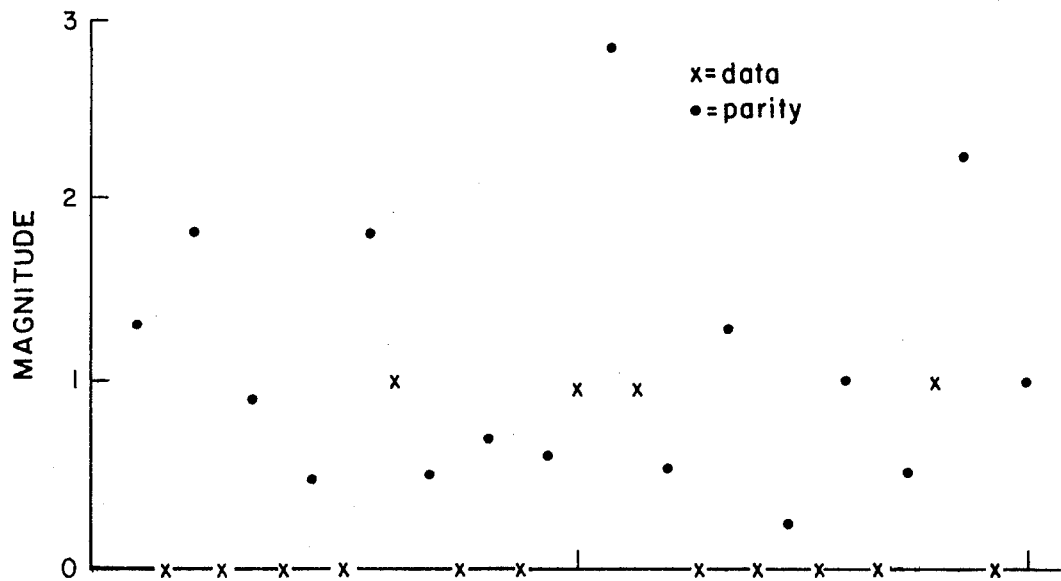
FIG. 6a shows magnitudes and phases of an interlaced data-parity sequence for leveling the spectrum of a data sequence {1000010011000010}.
FIG. 6b shows the moduli and phases of the leveled spectrum.
Figure 6:
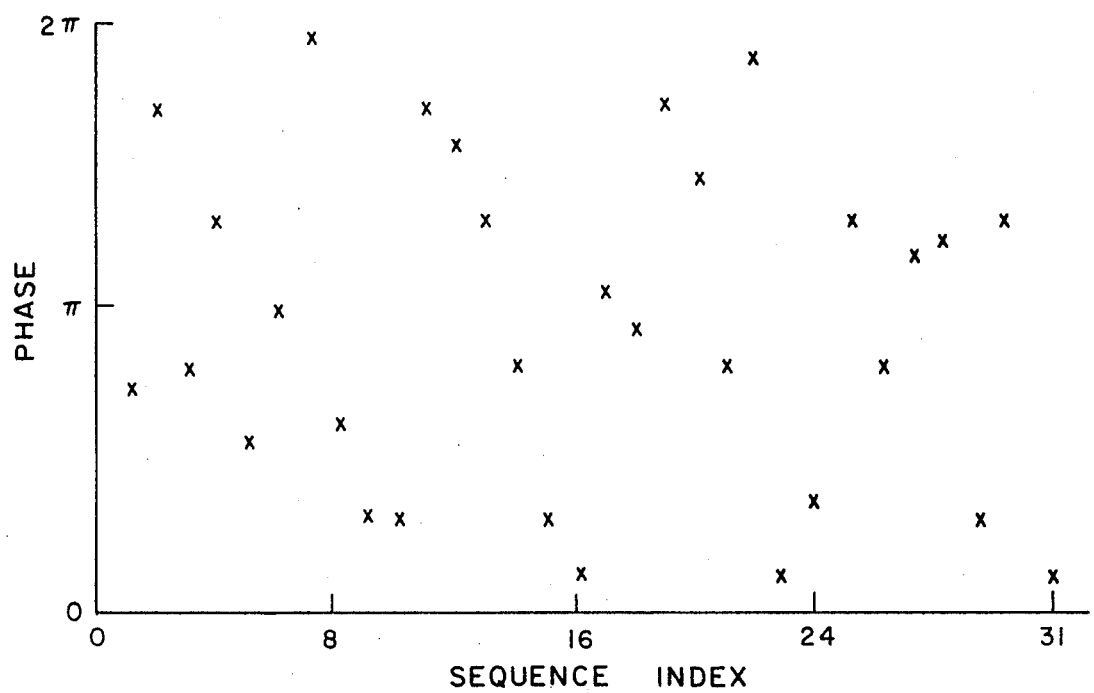
Figure 6:
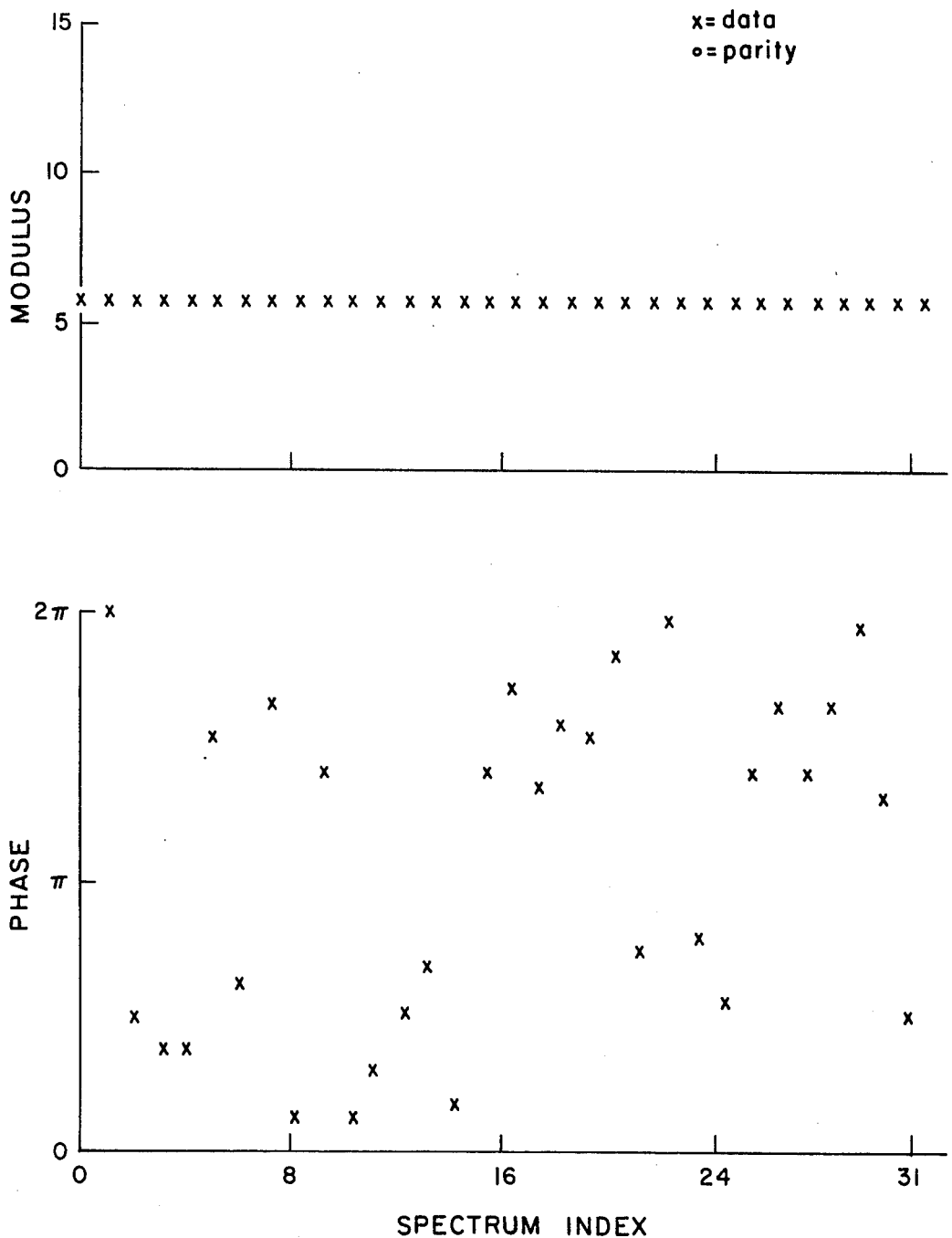

FIG. 5 shows the results of applying the above procedure to the sequence $\{U\}$. In FIG. 5(a), the magnitude and phase of the interlaced data-parity sequence are shown. FIG. 5(b) shows the modulus and phase of the spectrum $\{G_m\}$, which has been leveled to value $(32)^{1/2}$. FIGS. 6a and b show similar results for the sequence $\{V\}$, which again has had its spectrum leveled to value $(32)^{1/2}$. The data bits have identical intensities for binary ones in both cases.

Figure 7A:
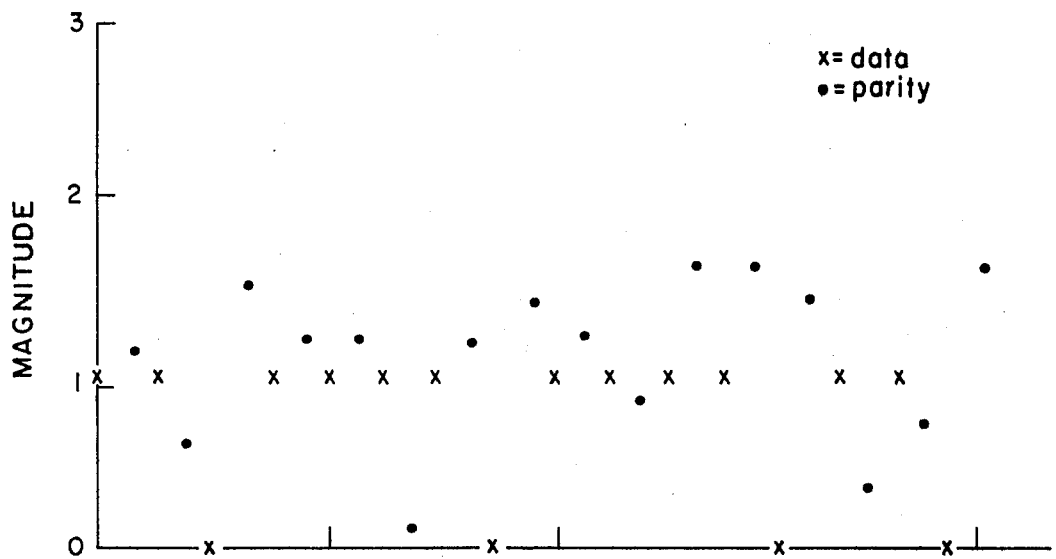
FIG. 7a illustrates the magnitudes and phases of an interlaced data-parity sequence that quantizes the phases of the spectrum of the data sequence {1101111011110110}.
Figure 7:
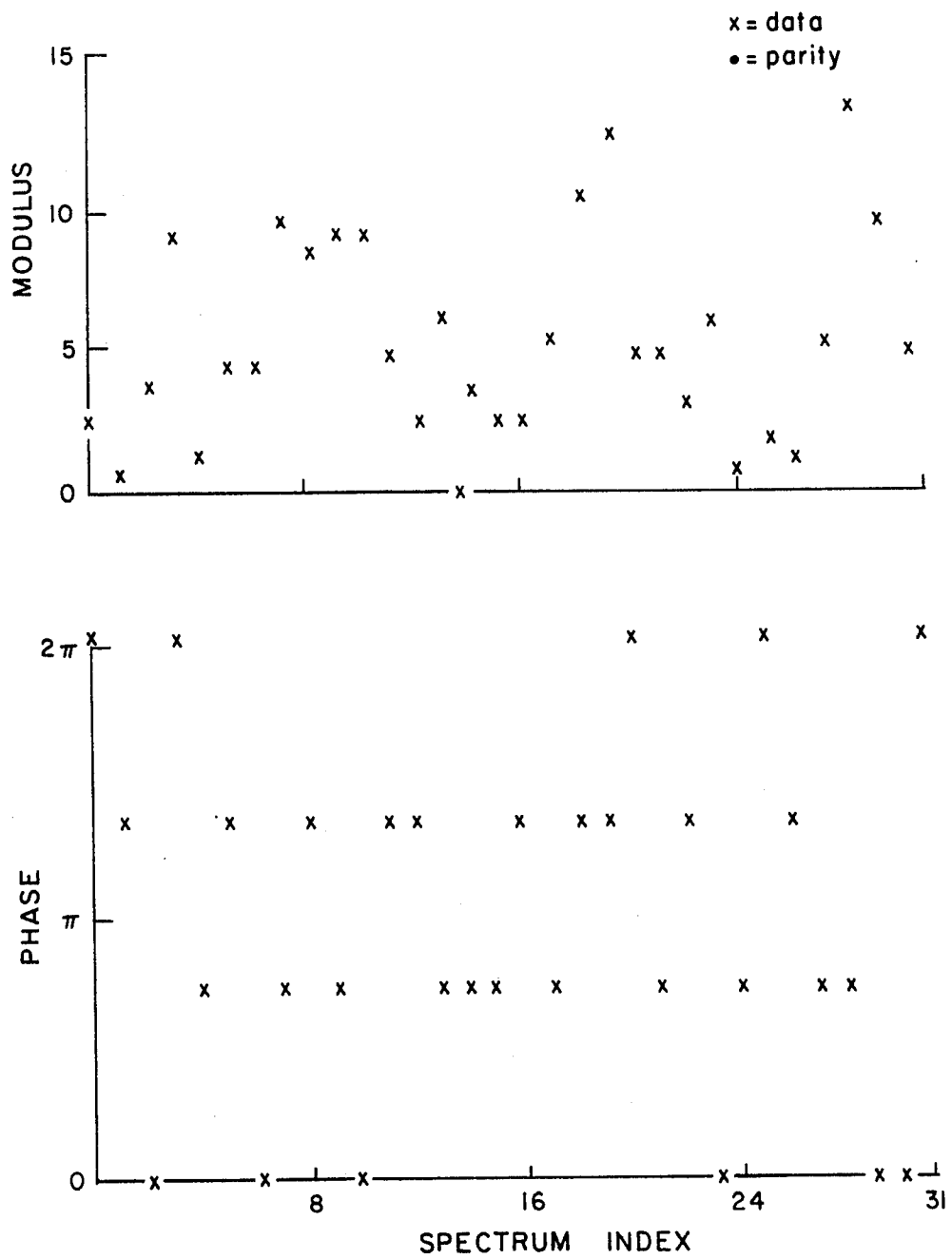
FIG. 7b illustrates the moduli and phases of the phase-quantized spectrum.

FIG. 7 shows the results obtained from the phase quantization procedure. The phase quantization levels are chosen to be those of the cube roots of unity. The phases of the spectral components have been successfully confined to the three levels chosen.

The spectrum shaping techniques discussed above have been implemented to obtain computer-generated phase-type holograms. In one series of experiments, we selected as input data a matrix representation consisting of an array of binary ones and zeros in the form of the letters A, B, C, and D. These characters were embedded in a field of 32 × 32 elements. Phase coding was first applied to the array to reduce the dynamic range of the spectrum; in particular each data value $f_{nq}$ was multiplied by $\exp[i2\pi nq/N']$, where $N'$ is the actual size of the data block enbedded in the 32 × 32 array. The phase coded array was then Fourier transformed using a two dimensional Fourier transform program on a digital computer, to produce a 32 × 32 array of complex Fourier coefficients.

$$F_{mp} = A_{mp} e^{(i\theta_{mp})}, \quad \begin{Bmatrix} m \\ p \end{Bmatrix} = 0,1,\ldots,31 \tag{33}$$

Separating amplitude and phase information produces two 32 × 32 matrices, one with amplitude elements $A_{mp}$ and the other with phase elements $\phi_{mp}$, all of the phases lying between 0 and 2.

To level the spectrum, we chose a constant $A_0$ larger than the largest spectral modulus and generated an acute angle $\phi_{mp}$ for each spectral component, where $\phi_{mp}$ is defined as the principal arc cosine of $A_{mp}/A_0$. We then generated a set of 64 × 64 constant modulus complex numbers, the elements of a 64 × 64 hologram (i.e., a 2 × 2 expansion of the original 32 × 32 matrix size) by assigning values to the hologram elements G in accordance with the following:

$$G_{m,p} = G_{m+32,p+32} = A_0 \exp i(\theta_{mp} + (-1)^{m+p}\phi_{mp})$$
$$G_{m+32,p} = G_{m,p+32} = A_0 \exp i(\theta_{mp} - (-1)^{m+p}\phi_{mp})$$

$m = 0,\ldots,31$
$p = 0,\ldots,31$ (34)

To add redundancy we replicated the entire 64 × 64 block 2 × 2 times. The resulting phase pattern (the amplitude is constant) composed of the phase arrays of $G$'s was then displayed on a CRT under computer control. The computer controlled the exposure contributed by each CRT spot by varying the time duration that the electron beam dwelled on that spot. In practice we used a 2 × 2 grid of points to represent each phase element, resulting in a total of 256 × 256 spots for the entire hologram.

Figure 8:
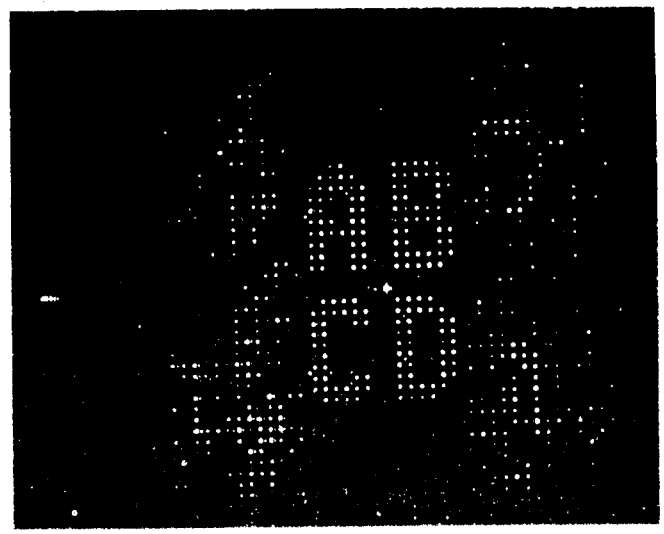
FIG. 8 shows a data-parity display reconstructed from a hologram made in accordance with one embodiment of the invention.

Various processes are possible for synthesizing a physical hologram from the CRT display. One method we have used is to photograph the CRT display with a standard oscilloscope camera using, a e.g., Polaroid print type 47 film. The resulting prints were later photographically reduced with a 35 mm camera and spectroscopic film such as Kodak 649F. During processing, the film was subjected to a prehardener and then bleached to produce a hologram. An alternate method we have used is to photograph the phase pattern on the CRT directly using a 35 mm camera with film such as Kodachrome II color reversal film. The photograph was taken using a Cyan filter mounted on a cardboard tube which also served to block ambient light. Phase matching over a 0 to $2\pi$ range was accomplished by calibrating the exposure times using sawtooth displays on the CRT. With the proper exposure to the CRT, the resulting density to Cyan light on the process film is proportional to the Fourier phase values. To complete production of the hologram, the exposed film was later reexposed to a flat white object through a No. 29 wratten red filter. The film was then developed by standard commercial developing processes. Finally black tape (or other mechanical means) was used to block off regions of the transparency outside the region of phase exposure, resulting in a final phase-type hologram. The holograms so produced were used to reconstruct the original image by illumination with 6,328 A light from a HeNe laser. Since the hologram has been previously exposed to red light, the red illuminating light is not significantly attenuated; however the Cyan absorbing emulsions exert an influence on the phase of the transmitted light, presumably through surface relief and index of refraction variations. The desired reconstructed image was obtained in the focal plane of a positive lens where it appeared centered about the optical axis. With this particular arrangement of the hologram elements in the hologram, the parity bits appear in the outer regions of the data field in the reconstruction. Visual interference between parity and data bits is thus minimized. This is demonstrated in FIG. 8. If the reconstructed image light were to be detected by light detectors positioned only at the row positions where data was anticipated rather than photographed, the parity bits would not be present in the final image.

The hologram may also be constructed from the hologram elements G using a procedure we call a synthetic Fourier coefficient method. In this method the holographic array is constructed according to the following:

$$G_{2m,2p} = G_{2m+1,2p+1} = A_0 \exp i(\theta_{mp} + \phi_{mp})$$
$$G_{2m+1,2p} = G_{2m,2p+1} = A_0 \exp i(\theta_{mp} - \phi_{mp})$$

$m = 0,1,\ldots,31$
$p = 0,1,\ldots,31$ (35)

Figure 9:
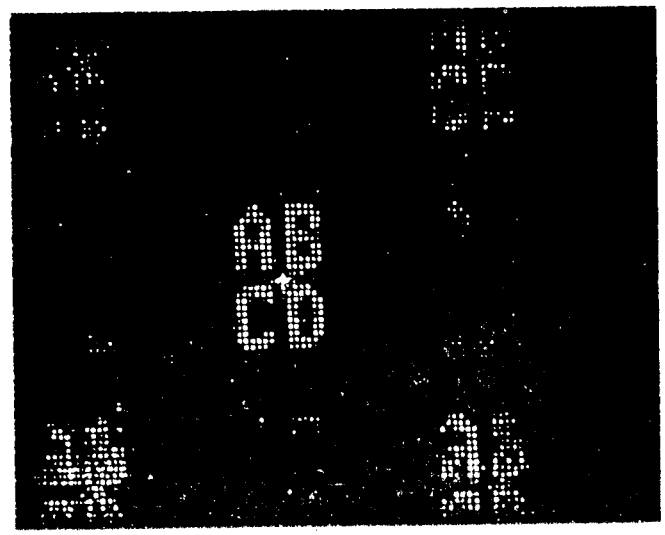
FIG. 9 is a data-parity display reconstructed from a hologram made in accordance with another embodiment.

The reconstructed parity points again appear toward the outer regions of the field while the data appears concentrated in the central regions of the field. However, the intensity of the data points is multiplied by a cosine type function which is unity near the center and decays to zero at the outer edges. Thus, since the data is concentrated near the center it will be relatively unaffected by such a function. The parity bits, on the other hand, are multiplied by a sine type function which is zero near the center and increases to unit in the outer regions. Any parity bits which are positioned near the data are thus diminished in intensity making for a better visual appearance. An example is illustrated in FIG. 9.

Other configurations have also been used, e.g. governed by:

$$G_{2m,2p} = G_{2m+1,2p} = A_0 \exp i\,(\theta_{mp} + \phi_{mp})$$
$$G_{2m,2p+1} = G_{2m+1,2p+1} = A_0 \exp i\,(\theta_{mp} - \phi_{mp}) \quad (36)$$

or by $$G_{2m,2p} = G_{2m,2p+1} = A_0 \exp i\,(\theta_{mp} + \phi_{mp})$$
$$G_{2m+1,2p} = G_{2m+1,2p+1} = A_0 \exp i\,(\theta_{mp} - \phi_{mp}) \quad (37)$$

all led to excellent results.

For data other than two-dimensional arrays, it is advantageous to use self-focusing Fresnel holograms rather than the Fourier transform type. The spectrum leveling technique may be fruitfully applied in these holograms also.

Appendix A

The inverse DFT of the $2N$-length sequence $\{F_m'\}$ can be calculated as follows: We note $$f_n' = \frac{1}{2N} \sum_{m=0}^{2N-1} F_m' \exp\left(i\frac{2\pi}{2N} mn\right)$$

$$= \frac{1}{2N} \sum_{m=0}^{N-1} F_m \exp\left(i\frac{2\pi}{2N} mn\right) \quad (A1)$$

$$+ \frac{1}{2N} \sum_{m=N}^{2N-1} F_{m-N} \exp\left(i\frac{2\pi}{2N} mn\right),$$

where we have used Eq. (2). Making the substitution $m' = m - N$ in the second summation, $$f_n' = \frac{1}{2N} \sum_{m=0}^{N-1} F_m \exp\left(i\frac{2\pi}{2N} mn\right)$$

$$+ \frac{1}{2N} \sum_{m'=0}^{N-1} F_{m'} \exp\left[i\frac{2\pi}{2N}(m'+N)n\right] \quad (A2)$$

$$= \frac{1}{2N}[1 + \exp(i\pi n)] \sum_{m=0}^{N-1} F_m \exp\left(i\frac{2\pi}{N} m\frac{n}{2}\right).$$

Thus $$f_n' = \begin{cases} f_{n/2} & n \text{ even,} \\ 0 & n \text{ odd.} \end{cases} \quad (A3)$$

Proceeding in a similar fashion for the sequence $\{P_n'\}$, we use Eq. (4) to obtain $$p_n' = \frac{1}{2N}[1 - \exp(i n\pi)] \sum_{m=0}^{N-1} P_m \exp\left(i\frac{2\pi}{N} m\frac{n}{2}\right)$$

$$= \frac{1}{2N}[1 - \exp(i n\pi)] \sum_{m=0}^{N-1}\left[P_m \exp\left(i\frac{\pi m}{N}\right)\right] \quad (A4)$$

$$\times \exp\left[i\frac{2\pi}{N} m\left(\frac{n-1}{2}\right)\right].$$

If follows that $$p_n' = \begin{cases} 0 & n \text{ even,} \\ p_{n-1/2} & n \text{ odd,} \end{cases} \quad (A5)$$

where $$p_n \triangleq \frac{1}{N} \sum_{m=0}^{N-1}\left[P_m \exp\left(i\frac{\pi m}{N}\right)\right] \exp\left(i\frac{2\pi}{N} mn\right). \quad (A6)$$

Appendix B

Our goal is to calculate the two-dimensional inverse DFT of the sequence $\{F_{m,r}'\}$ defined by Eq. (22). The $N \times 2Q$ inverse DFT of this sequence is $$f_{n,q}' = \frac{1}{2NQ} \sum_{m=0}^{N-1} \sum_{r=0}^{2Q-1} F_{m,r}' \exp\left[i2\pi\left(\frac{mn}{N} + \frac{rq}{2Q}\right)\right]. \quad (B1)$$

Substituting Eq. (22) for $F_{m,r}'$, we obtain after some manipulation $$f_{n,q}' = \frac{1}{2}[1 + \exp(i\pi q)] \frac{1}{NQ} \sum_{m=0}^{N-1} \sum_{r=0}^{Q-1}$$

$$\times F_{m,r} \exp\left[i2\pi\left(\frac{mn}{N} + \frac{rq}{2Q}\right)\right]. \quad (B2)$$

It follows that $$f_{n,q}' = \begin{cases} f_{n,(q/2)} & q \text{ even,} \\ 0 & q \text{ odd,} \end{cases} \quad (B3)$$

for $n = 0,1,...,N - 1$.

We proceed in a similar fashion with the sequence $\{P_{n,q}'\}$. Thus $$p_{n,q}' = \frac{1}{2NQ} \sum_{m=0}^{N-1} \sum_{r=0}^{2Q-1} P_{m,r}' \exp\left[i2\pi\left(\frac{mn}{N} + \frac{rq}{2Q}\right)\right]. \quad (B4)$$

Substituting Eq. (23) for $P_{m,r}'$, we obtain $$p_{n,q}' = \frac{1}{2}[1 - \exp(i\pi q)] \frac{1}{NQ} \sum_{m=0}^{N-1} \sum_{r=0}^{Q-1}$$

$$\times P_{m,r} \exp\left[i2\pi\left(\frac{mn}{N} + \frac{rq}{2Q}\right)\right]. \quad (B5)$$

Following the procedure used in Eq. (A4), we obtain $$p_{n,q}' = \begin{cases} 0 & q \text{ even,} \\ p_{n,(q-1)/1} & q \text{ odd,} \end{cases} \quad (B6)$$

where $n = 0,1,...,N - 1$ and $$f_{n,q} \triangleq \frac{1}{NQ} \sum_{m=0}^{N-1} \sum_{r=0}^{Q-1} \left[ P_{m,r} \exp\left(i\frac{rr}{Q}\right) \right] \exp\left[i2\pi\left(\frac{mn}{N} + \frac{rq}{Q}\right)\right] \quad (B7)$$

I claim:

1. A method of synthesizing an output array of elements in which an input two-dimensional $N \times Q$ data array is embedded, each element of said data array being indicative of a complex number $f_{n,q}$, said method comprising the steps of:

producing an $N \times Q$ discrete Fourier transform spectrum array of said input data array, each element of said Fourier transform spectrum array being a complex number $F_{m,p}$;

producing an extended spectral array of order $(yN) \times (zQ)$, $y$ and $z$ being integer numbers, at least one of $y$ and $z$ being greater than unity, each element of said extended spectral array being a complex number $G_{m,p}$ having a modulus and a phase each being a preselected value, subject to a condition among the elements of said extended spectral array given by an equation to be satisified for a substantial number of $F_{m,p}$ $$F_{m,p} = \frac{1}{yz} \sum_{i=0}^{y-1} \sum_{j=0}^{z-1} G_{m+iN, p+jQ} ;$$

and producing an inverse Fourier transform of said extended spectral array to generate an output array of order $(yN) \times (zQ)$ in which a representation of said input data array is embedded.

2. A method as in claim 1 including the step of phase coding said elements $f_{n,q}$ of said data array before producing said discrete Fourier transform spectrum array.

3. A method as in claim 1 wherein the step of producing an extended spectral array comprises the step of producing an extended spectral array whose elements all have the same modulus.

4. A method as in claim 3 including the step of phase coding said elements $f_{n,q}$ of said data array before producing said discrete Fourier transform spectrum array.

5. A method as in claim 3 wherein the step of producing an extended spectral array comprises the steps of:

determining a constant real number $A$ greater than the modulus of a substantial number of $F_{mp}$ of said discrete Fourier transform array; and producing an extended spectral array wherein those elements which are associated with said substantial number of elements $F_{mp}$ satisfy equations $$G_{mp} = G_{m+n,p+q} = A \exp\left\{i[(\arg F_{mp}) \pm (-1)^{m+p}\cos^{-1}\left|\frac{|F_{mp}|}{A}\right|]\right\}$$

$$G_{m+N,p} = G_{m,p+q} = A \exp\left\{i[(\arg F_{mp} \mp (-1)^{m+p}\cos^{-1}\left|\frac{|F_{mp}|}{A}\right|]\right\}$$

thereby producing an extended spectral array whose elements all have the same modulus.

6. A method as in claim 5 including the step of phase coding said elements $f_{n,q}$ of said data array before producing said discrete Fourier transform spectrum array.

7. A method as in claim 1 wherein the step of producing an extended spectral array comprises the step of producing an extended spectral array wherein each element of said extended spectral array has a phase equal to one of a preselected plurality of values.

8. A method of synthesizing an output array of elements in which an input two-dimensional $N \times Q$ data array is embedded, each element of said data array being indicative of a complex number $f_{n,q}$, said method comprising the steps of:

producing an $N \times Q$ discrete Fourier transform spectrum array of said input data array, each element of said Fourier transform spectrum array being a complex number $F_{m,p}$;

determining a constant real number $A$ greater than the modulus of a substantial number of elements $F_{mp}$ of said discrete Fourier transform array;

producing an extended spectral array of order $(2N) \times (2Q)$, each element of said extended spectral array being a complex number $G_{m,p}$ and those elements which are associated with said substantial number of $F_{m,p}$ satisfy the following equations:

$$G_{2m,2p} = G_{2m+1,2p+1} = A_o \exp i(\theta_{mp} + \phi_{mp}) \quad m=0,1,...,N-1$$
$$G_{2m+1,2p} = G_{2m,2p+1} = A_o \exp i(\theta_{mp} - \phi_{mp}) \quad p=0,1,...,Q-1$$

where $\theta_{mp} = \arg(F_{mp})$ and $\phi_{mp} = \cos^{-1}\frac{|F_{mp}|}{A}$ producing an inverse Fourier transform of said extended spectral array to generate an output array of order $(2N) \times (2Q)$ in which a representation of said input data array is embedded.

9. A method as in claim 8 including the step of phase coding said elements $f_{n,q}$ of said data array before producing said discrete Fourier transform spectrum array.

10. A method for making a hologram of a two-dimensional $N \times Q$ data array comprising the steps of:

producing an $N \times Q$ discrete Fourier transform spectrum array of said input data array, each element of said Fourier transform spectrum array being a complex number $F_{m,p}$;

producing an extended spectral array of order $(yN) \times (zQ)$, $y$ and $z$ being integer numbers, at least one of $y$ and $z$ being greater than unity, each element of said extended spectral array being a complex number $G_{m,p}$ having a modulus and a phase each being a preselected value, subject to a condition among the elements of said extended spectral array given by an equation satisfied for a substantial number of $F_{mp}$.

$$F_{m,p} = \frac{1}{yz} \sum_{i=0}^{y-1} \sum_{j=0}^{z-1} G_{m+iN, p+jQ} ; \text{ and}$$

recording a representation of said extended spectral array on a transparent medium.

11. A method for making a hologram as in claim 10 including the step of phase coding the elements of said data array.

12. A method for making a hologram as in claim 10 wherein the step of producing an extended spectral array comprises the step of producing an extended spectral array whose elements all have the same modulus.

13. A method as in claim 12 including the step of phase coding the elements of said data array.

14. A method as in claim 12 wherein the step of producing an extended spectral array comprises the steps of:
   determining a constant real number $A$ greater than the modulus of a substantial number of elements $F_{mp}$ of said discrete Fourier transform array; and
   producing an extended spectral array wherein those elements which are associated with said substantial number of elements $F_{mp}$ satisfy equations $$G_{mp} = G_{m+n,p+q} = A \exp i\{\arg F_{mp}\} \pm (1)^{m+p}\cos^{-1}\frac{F_{mp}}{A}\}$$

$$G_{m+n,p} = G_{m,p+q} = A \exp \{\arg F_{mp} \mp (-1)^{m+p}\cos^{-1}\frac{F_{mp}}{A}\}$$

thereby producing an extended spectral array whose elements all have the same modulus.

15. A method as in claim 14 including the step of phase coding the elements of said data array.

16. A method for making a hologram as in claim 10 wherein the step of recording a representation of said extended spectral array comprises the steps of:
   displaying a representation of said extended spectral array by means of an optical display; and
   photographically reproducing an image of said representation onto a transparent medium.

* * * * *

UNITED STATES PATENT AND TRADEMARK OFFICE
CERTIFICATE OF CORRECTION

PATENT NO. : 3,884,546
DATED : May 20, 1975
INVENTOR(S) : David C. Chu

Page 1 of 2

It is certified that error appears in the above-identified patent and that said Letters Patent are hereby corrected as shown below:

Column 5, line 9, after "sequence", " $\{P_n\}$ " should read -- $\{p_n\}$ --; line 33, " $\{p_m'\}$ " should read -- $\{P_m'\}$ --; line 49, "$P_n$" should read -- $\{P_n\}$ --;

Column 7, Eq. (16), that portion reading " $0<\psi_{k-1}$ " should read -- $0<\psi_{k+1}$ --; Eq. (18), those two portions reading "$\psi_k$" should read -- $\psi_h$ --; Eq. (19) should read --

$$0<\alpha=\cot^{-1}\left[\frac{\sin(\theta_m-\psi_k)}{\sin(\psi_h-\psi_k)\sin(\psi_h-\theta_m)}-\cot(\psi_h-\psi_k)\right]$$
$$\leq \pi-(\psi_h-\psi_k) \quad --;$$

Column 8, line 39, "2q" should read -- 2Q --; Eq. (22), that portion reading "r=QQ+1" should read -- r=Q,Q+1 --; Eq. (23), that portion reading "$\{^{n,(q/2)}_0$ " should read -- $\{^{f_{n,(q/2)}}_0$ --.

Column 12, line 14, before "e.g.," delete " a ";

UNITED STATES PATENT AND TRADEMARK OFFICE
CERTIFICATE OF CORRECTION

PATENT NO. : 3,884,546
DATED : May 20, 1975
INVENTOR(S) : David C. Chu

It is certified that error appears in the above-identified patent and that said Letters Patent are hereby corrected as shown below:

Column 17, the equation on the last line should read --

$$G_{mp} = G_{m+n, p+Q} = A \exp\left\{i\left[(argF_{mp}) \pm (-1)^{m+p} \cos^{-1}\left|\frac{F_{mp}}{A}\right|\right]\right\} \quad --;$$

Column 18, the equation on the first line should read --

$$G_{m+N, p} = G_{m, p+Q} = A \exp\left\{i\left[(argF_{mp}) \mp (-1)^{m+p} \cos^{-1}\left|\frac{F_{mp}}{A}\right|\right]\right\} \quad --.$$

Signed and Sealed this seventeenth Day of February 1976

[SEAL]

Attest:

RUTH C. MASON
*Attesting Officer*

C. MARSHALL DANN
*Commissioner of Patents and Trademarks*